(12) United States Patent
Hall (10) Patent No.: US 8,047,744 B2
(45) Date of Patent: Nov. 1, 2011

(54) CONDUIT LAYING MACHINE (76) Inventor: Ronald Hall, Woodstock (CA)

( * ) Notice: Subject to any disclaimer, the term of this patent is extended or adjusted under 35 U.S.C. 154(b) by 377 days.

(21) Appl. No.: 12/258,361

(22) Filed: Oct. 24, 2008

(65) Prior Publication Data

US 2010/0104374 A1  Apr. 29, 2010

(51) Int. Cl.
*E02F 5/10* (2006.01)
*E02F 5/12* (2006.01)
*F16L 1/032* (2006.01)

(52) U.S. Cl. ........ 405/183; 405/177; 405/178; 405/179; 405/181

(58) Field of Classification Search .................. 405/174, 405/177, 178, 179, 180, 181, 183
See application file for complete search history.

(56) References Cited

U.S. PATENT DOCUMENTS

| | | | | |
|---|---|---|---|---|
| 3,849,998 A * | 11/1974 | Thacker | ......................... | 405/179 |
| 3,851,489 A * | 12/1974 | Richardson | ................... | 405/178 |
| 4,332,511 A * | 6/1982 | Bradley et al. | ................. | 405/178 |
| 4,812,078 A * | 3/1989 | Rivard | ......................... | 405/179 |
| 5,090,141 A | 2/1992 | Hall | | |
| 5,119,888 A | 6/1992 | Hall | | |
| 5,190,409 A | 3/1993 | Hall | | |
| 6,244,355 B1 | 6/2001 | Hall | | |
| 6,318,006 B1 | 11/2001 | Hall | | |
| 6,397,500 B1 | 6/2002 | Hall | | |
| 6,854,931 B1 * | 2/2005 | Lopata | ......................... | 405/179 |

* cited by examiner

*Primary Examiner* — Tara Mayo-Pinnock
(74) *Attorney, Agent, or Firm* — Katten Muchin Rosenman LLP (57) ABSTRACT

In one aspect, the invention is directed to a conduit laying system for laying conduit, including a vehicle, a trench former, a conduit feed system and a base material handling system. The trench former is configured for forming a trench. The conduit feed system includes a conduit feed passage having a conduit feed passage inlet for receiving at least one conduit and a conduit feed passage outlet positioned to deposit the at least one conduit in the trench. The base material handling system includes a base material hopper and at least one base material passage. The at least one base material passage is positioned to receive base material from the base material hopper and to discharge base material in the trench around the at least one conduit. The base material handling system, the conduit feed system and the trench former are driven by the vehicle.

25 Claims, 9 Drawing Sheets

CONDUIT LAYING MACHINE

FIELD OF THE INVENTION

The present invention relates to conduit laying machines and more particularly to conduit laying machines that lay conduits, such as high-voltage electrical cables, and that discharge base material around the conduits.

BACKGROUND OF THE INVENTION

Laying electrical cables underground is typically accomplished by digging a trench and laying the cable in the trench. The trench may be dug using a backhoe loader or the like and the cable may be laid in the trench manually, while being fed from a reel that is mounted on a truck. Typically, such work is slow, and relatively labour intensive.

Systems have been proposed to lay cable in an open trench, however, such systems suffer from a variety of shortcomings. For example, in some instances, no means for protecting the cable in the trench is provided. Accordingly, the cable is at risk of puncture or other damage from exposed rocks and the like in the trench.

It would be advantageous to provide a system that lays cable or other types of conduit while protecting it from damage.

SUMMARY OF THE INVENTION

In a first aspect, the invention is directed to an assembly for laying conduit, including a trench former, a conduit feed system and a base material handling system. The trench former is configured for forming a trench. The conduit feed system includes a conduit feed passage having a conduit feed passage inlet for receiving at least one conduit and a conduit feed passage outlet positioned to deposit the at least one conduit in the trench. The base material handling system includes a base material hopper and at least one base material passage. The at least one base material passage is positioned to receive base material from the base material hopper and to discharge base material in the trench around the at least one conduit. Optionally, the invention is directed to a conduit laying system that is made up of the aforementioned assembly and a vehicle for driving the assembly. Optionally, depending on the type of conduit that is to be laid, the conduit laying system may further include a conduit reel holder mounted to the vehicle for holding one or more reels of conduit. The at least one base material passage may be configured in a way to inhibit the base material from bridging therein. For example, the at least one base material passage may have a cross-sectional area that increases in a downward direction. Additionally or alternatively, the base material passage may extend in a downward direction (not necessarily a strictly downward direction) and may have a lateral spacing and a longitudinal spacing, whereby the lateral and longitudinal directions are relative to the direction of travel of the base material handling system. One of the lateral and longitudinal spacings may be shorter than the other. The shorter of the spacings may increase in a downward direction.

In a second aspect, the invention is directed to a conduit laying system including a trench former, a conduit feed system and a base material handling system. The trench former is configured for forming a trench and includes a vibration mechanism. The conduit feed system includes a conduit feed passage having a conduit feed passage inlet for receiving at least one conduit and a conduit feed passage outlet positioned to deposit the at least one conduit in the trench. The base material handling system includes a base material hopper and at least one base material passage. The at least one base material passage is positioned to receive base material from the base material hopper and to discharge base material in the trench around the at least one conduit. The base material in the hopper and/or in the at least one base material passage may be subject to vibration from the vibration mechanism. The at least one base material passage may be configured to inhibit bridging of base material therein.

BRIEF DESCRIPTION OF THE DRAWINGS

The present invention will now be described by way of example only with reference to the attached drawings, in which.

DETAILED DESCRIPTION OF THE INVENTION

Figure 1:
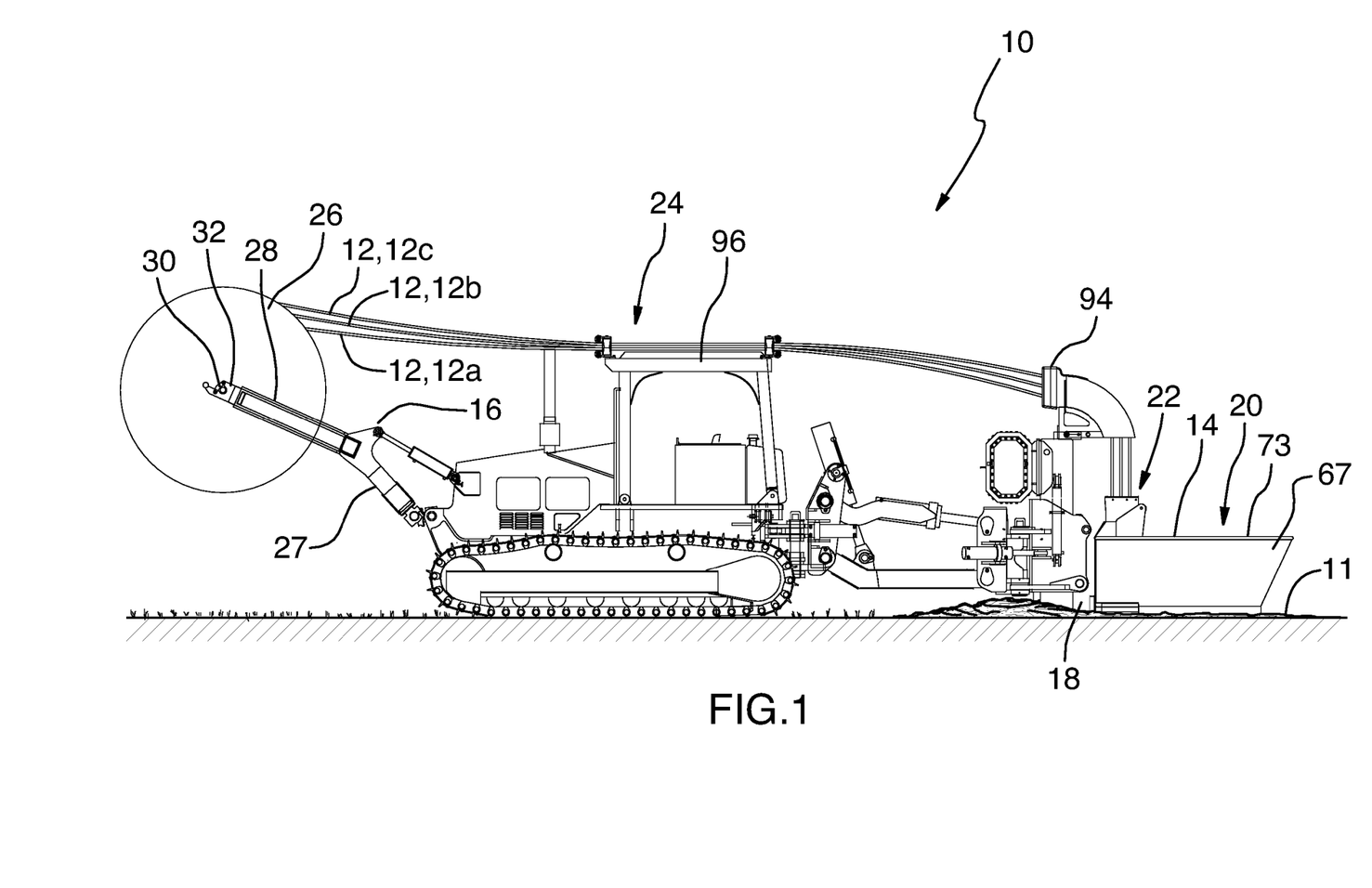
FIG. 1 is a perspective view of a system for creating a trench and for laying one or more conduits in the trench in accordance with an embodiment of the present invention.

Reference is made to FIG. 1, which shows a system 10 for creating a trench 11 and for laying one or more conduits 12 in the trench 11 in accordance with an embodiment of the present invention. The system 10 shown in FIG. 1 lays three conduits 12. It is however, possible for a system in accordance with an embodiment of the invention to lay some other number of conduits 12, such as one conduit 12, two conduits 12 or more. The conduits 12 may be any suitable type of conduits. For example, the conduits 12 may be high voltage, electrical conduits (which may also be referred to as electrical cables), wherein each conduit 12 carries one phase of a three-phase electrical supply.

The system 10 also discharges a base material 14 around the conduits 12 in the trench 11, which supports the conduits 12 and assists in protecting the conduits against damage from sharp rocks and the like that may be exposed when the trench 11 is formed.

The base material 14 may be any suitable base material, such as, for example, a granular particulate material, or a slurry that hardens after a period of time. Some examples of base materials 14 that may be used include sand, concrete, cement, and particulate material that absorbs moisture from the ground around it to harden into a solid.

Figure 2:
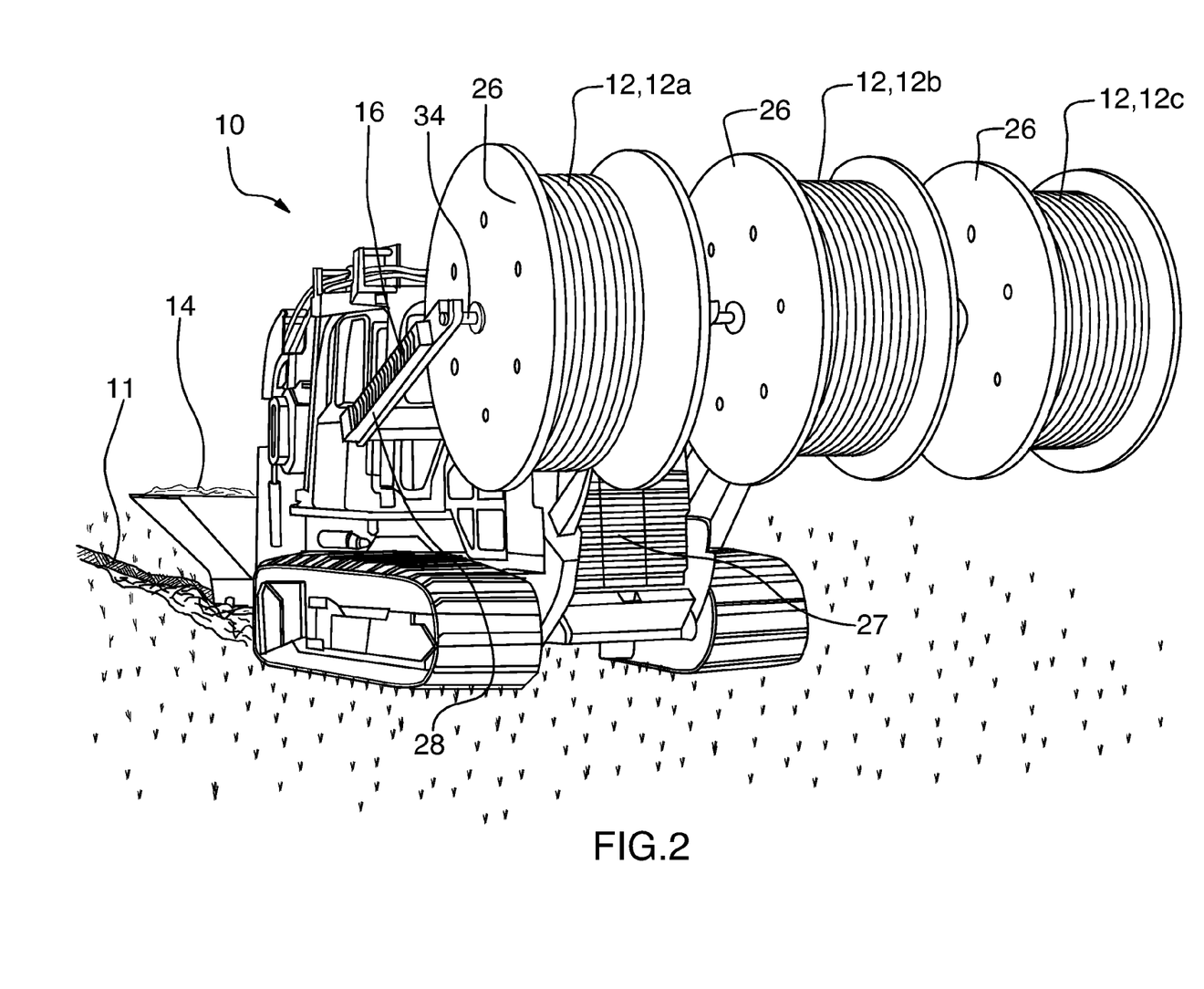
FIG. 2 is another perspective view of the system shown in FIG. 1 showing the front of the system.

The system 10 includes a conduit reel support 16, a trench former 18, a base material handling system 20, a conduit feed system 22 and a vehicle 24. In the embodiment shown in FIG. 1, the conduit reel support 16 is positioned at the front of the vehicle 24 and is configured to hold three reels 26 (best seen in FIG. 2) of conduit 12. The front of the vehicle is shown at 27. The conduit reel support 16 may include a plurality of arms 28 having ends 30 that include cradles 32 for holding the shafts, shown at 34 (see FIG. 2) of the conduit reels 26. The arms 28 may be movable between a loading/unloading position in which new reels 26 may be rolled into position in the cradles 32 or in which spent reels 26 may be rolled out of the cradles 32, and a use position (shown in FIGS. 1 and 2) in which the reels 26 are held above the ground and are rotatable. Optionally, when the reels 26 are held in the use position they are freely rotatable in the cradles 32. Alternatively, a tensioning means is provided to maintain some selected tension in the conduit 12 and to inhibit the reels 26 from releasing more than a selected amount of conduit 12. In embodiments configured for laying high-voltage electrical conduit 12, it may be advantageous to omit a tensioning means so that the tensile stress on the electrical conduit 12 is reduced.

Figure 3:
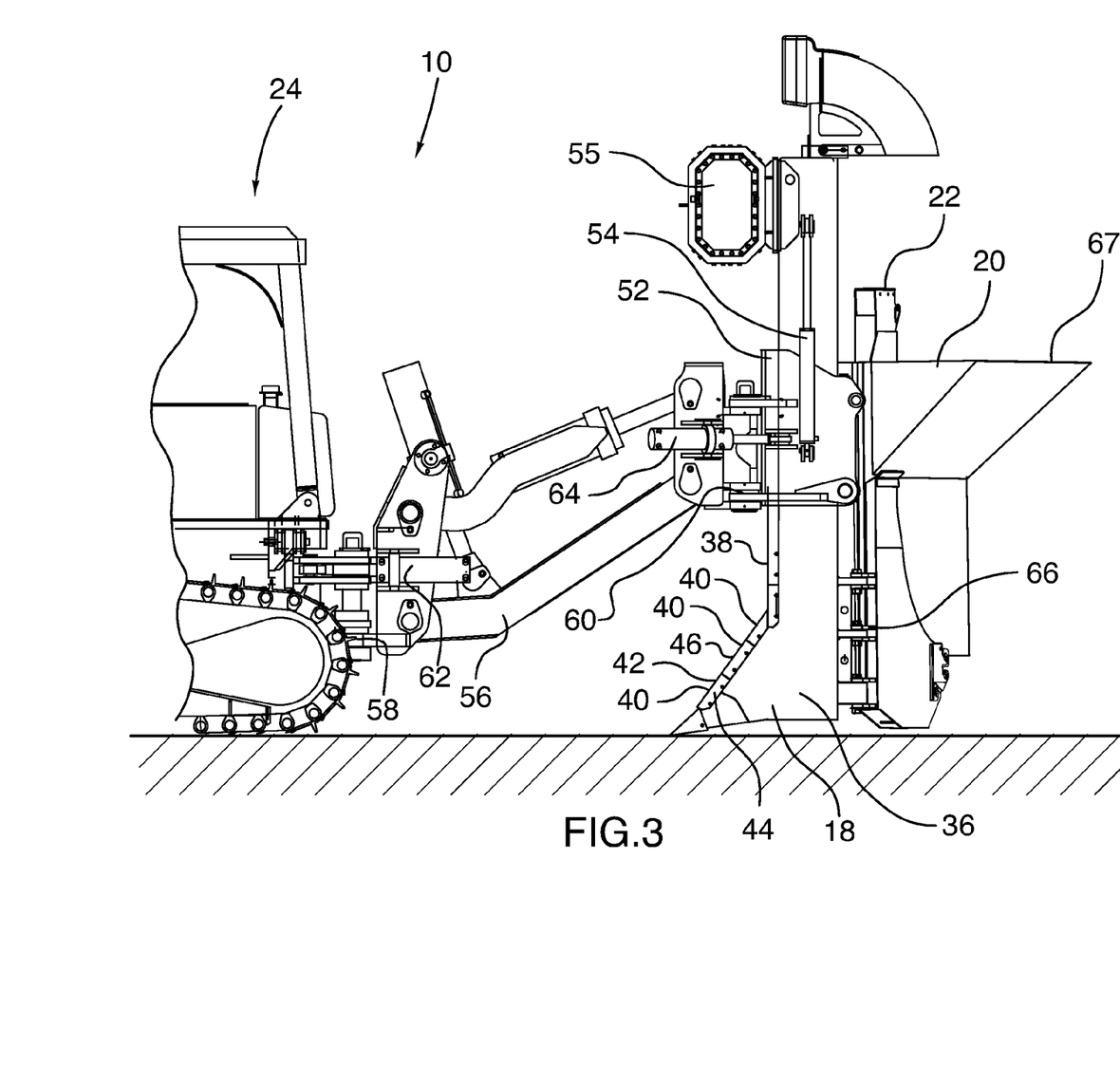
FIG. 3 is a side view of a portion of the system shown in FIG. 1.

The trench former 18 is configured to form the trench 11 as the vehicle 24 moves forward. The trench former 18 may have any suitable structure for forming the trench 11. For example, referring to FIG. 3, the trench former 18 may be configured as a plow and may include a body 36 having a front face 38 covered with a plurality of plowing elements 40. The plowing elements 40 may be generally C-shaped, having generally front faces shown at 42, which are flat in a lateral direction, and generally planar side faces 44, and having relatively sharp lateral corner edges 46 at the junctions of the front faces 42 and the side faces 44 respectively. During operation, as the vehicle 24 moves forward, the plowing elements 40 continuously raise earth upwards out of the trench 11. The plowing elements 40 may be removably mounted to the trench former body 36, and may thus be made from a material that is different from that of the trench former body 36 and that is selected for reduced wear during use. Additionally, by making the plowing elements 40 removable from the trench former body 36, the plowing elements 40 may be easily replaced when they are excessively worn. The trench former body 36 may be slidably mounted on a trench former base 52 and may be vertically adjustable with respect to the trench former base 52 by any suitable means, such as by a trench former height adjustment hydraulic cylinder 54. The trench former height adjustment hydraulic cylinder 54 may be used to control the depth of the trench 11 that is formed.

A separate vibratory mechanism 55 (FIG. 3) may be provided with the trench former 18 to assist in loosening earth in front of the trench former 18. The vibratory mechanism 55 may have any suitable structure. Alternatively, depending on the type of trench former that is used, vibration may inherently be produced. For example, certain types of trench former inherently produce some vibration during use and as such can be considered to include a vibratory mechanism. Some effects of such vibration are discussed further below.

The trench former 18 may be connected to the vehicle 24 in any suitable way. For example, a connecting arm 56 may have a first pivot connection 58 to the rear of the vehicle 24 about a vertical axis, and a second pivot connection 60 to the trench former base 52 about a vertical axis. The pivot connections 58 and 60 facilitate the vehicle 24 turning while the trench former 18 is in the ground. It is alternatively possible to eliminate the connection arm 56 and to provide a single pivot connection between the vehicle 24 and the trench former 18, however. By providing the connecting arm 56 with pivot connections 58 and 60 to the vehicle 24 and trench former 18, a greater degree of flexibility is provided for the movement of the vehicle 24 with respect to the trench former 18, relative to an embodiment with a single pivot connection and no connecting arm. First and second pivot angle adjustment hydraulic cylinders 62 and 64 may be provided at the first and second pivot connections 58 and 60 for actively controlling the angles of the pivot connections 58 and 60.

Figure 4:
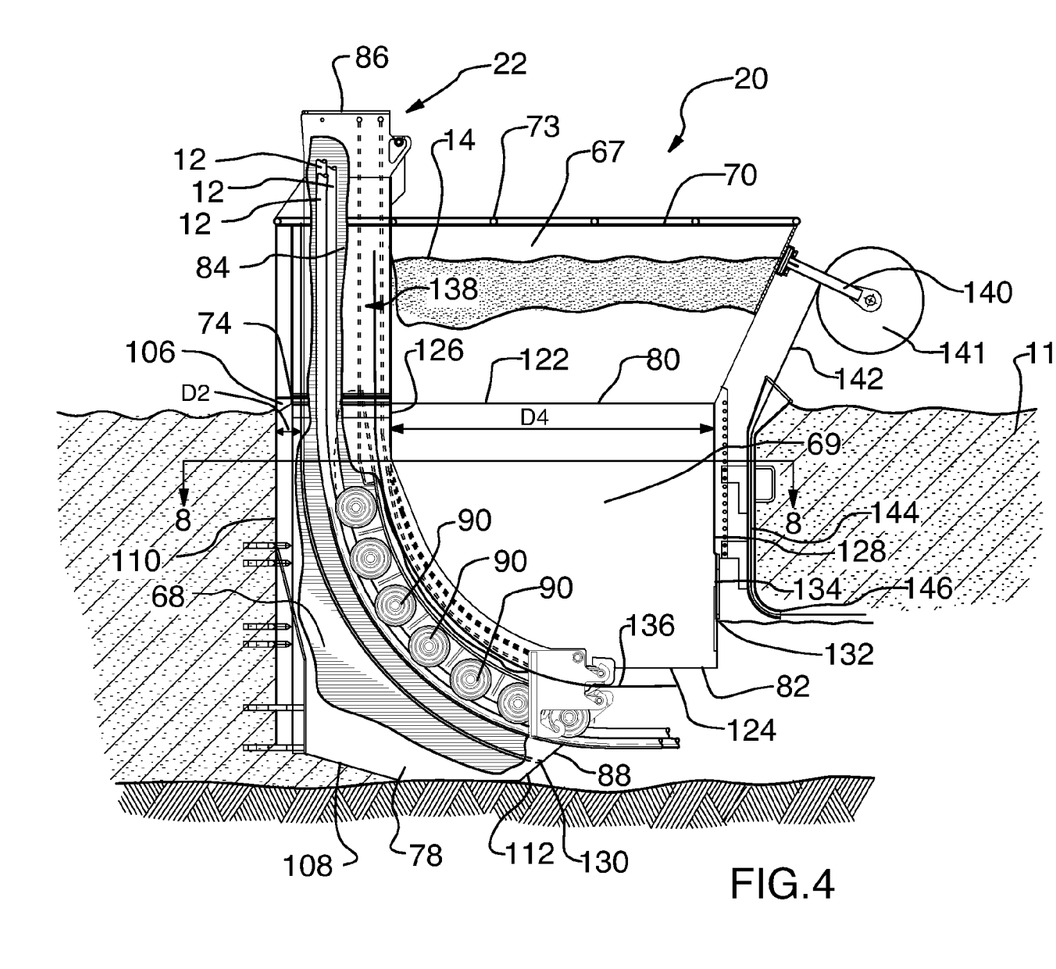
FIG. 4 is a sectional side view of a portion of the system shown in FIG. 1.
Figure 5:
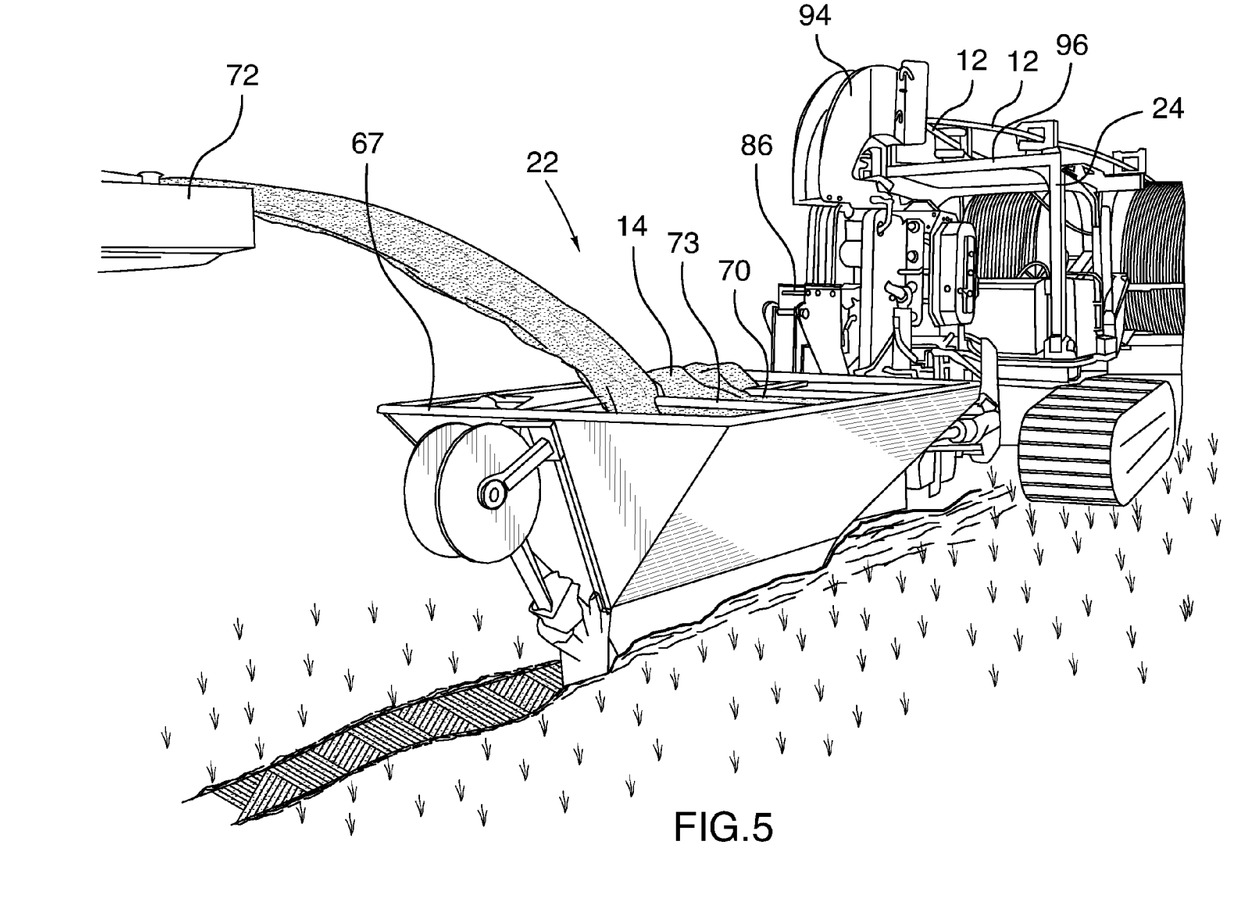
FIG. 5 is a another perspective view of the system shown in FIG. 1 showing the rear of the system.

The base material handling system 20 is positioned rearwardly of the trench former 18 and may be pivotally connected to the rear of the trench former 18 at a third pivotal connection 66 about a vertical axis. Referring to FIG. 4, the base material handling system 20 includes a base material hopper 67, a first base material passage 68 and a second base material passage 69. The base material hopper 67 has an inlet 70 at the top. The base material 14 may be fed into the base material hopper 67 by any suitable means. For example, in the embodiment shown in FIG. 1, wherein the base material 14 is sand, a sand storage and feed vehicle 72 (FIG. 5) may travel behind the base material hopper 67 and may feed sand into the base material hopper inlet 70 via a belt conveyor or the like. A coarse grating 73 may be provided at the base material hopper inlet 70, which assists in breaking up large agglomerations of base material, and which also braces and strengthens the base material hopper 67 in the region of the hopper inlet 70.

Figure 6:
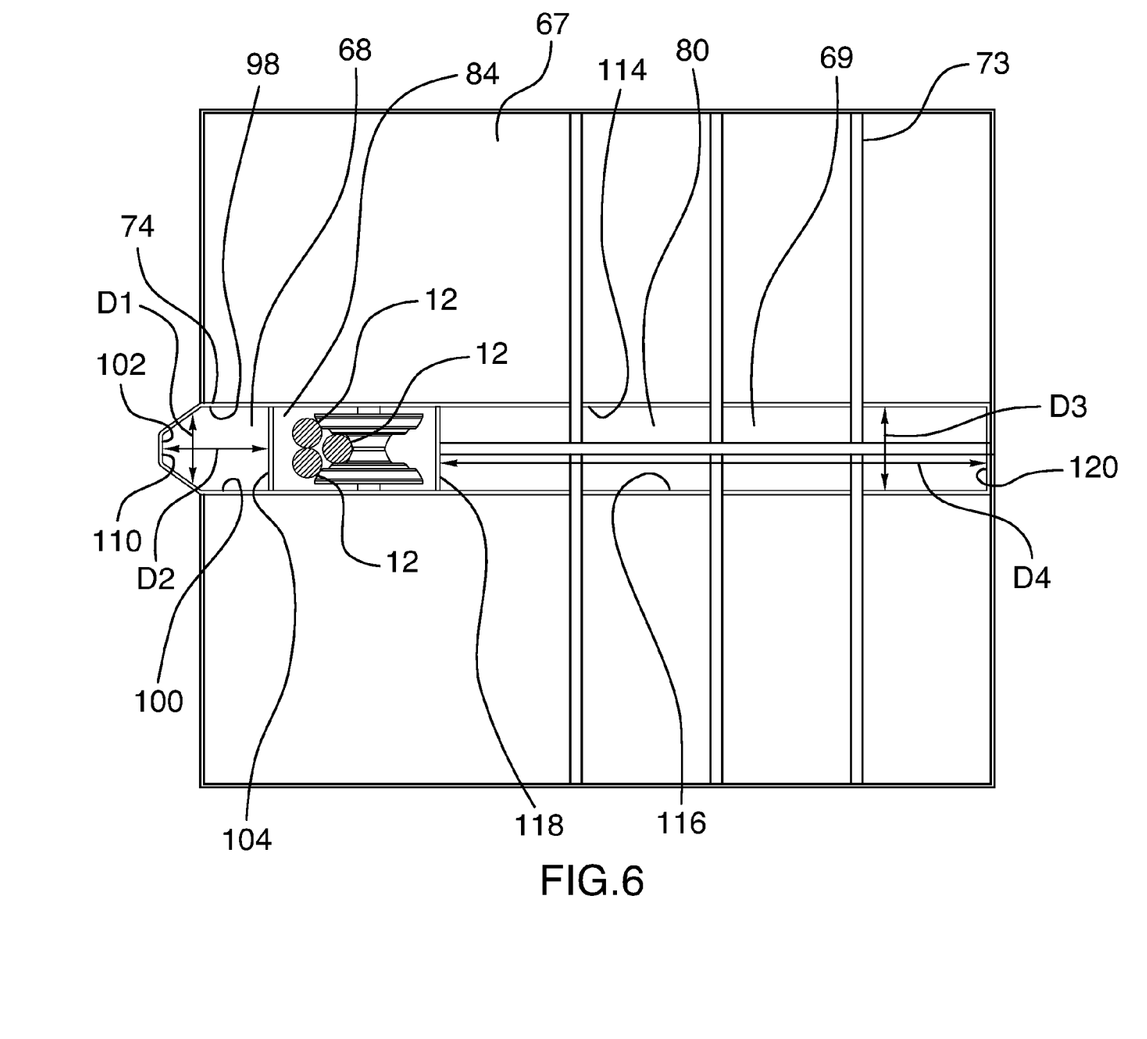
FIG. 6 is a plan view of the portion of the system shown in FIG. 4.

Referring to FIG. 6, the base material hopper 67 has a first hopper outlet 74 that feeds base material 14 into the first base material passage 68 (FIG. 4), which discharges base material into the trench 11 at a first base material passage outlet 78. The base material hopper 67 also has a second hopper outlet 80 that feeds base material 14 into the second base material passage 69 which discharges base material into the trench 11 at a second base material passage outlet 82.

The conduit feed system 22 includes a conduit feed passage 84 that extends from a conduit feed passage inlet 86 to a conduit feed passage outlet 88. The conduit feed passage outlet 88 is positioned between the first base material passage outlet 78 and the second base material passage outlet 82 in the sense that the conduits 12 are deposited in the trench 11 above the base material 14 discharged from the first base material passage outlet 78 and base material 14 is discharged from the second base material passage outlet 82 above the conduits 12 in the trench 11.

The conduit feed passage 84 may extend down through the base material hopper 67 and between the first and second base material passages 68 and 69. Alternatively the conduit feed passage 84 may have another routing whereby it extends downwards outside of the base material hopper 67 such that the conduit feed passage outlet 88 still terminates between the first and second base material passages 68 and 69.

Figure 7:
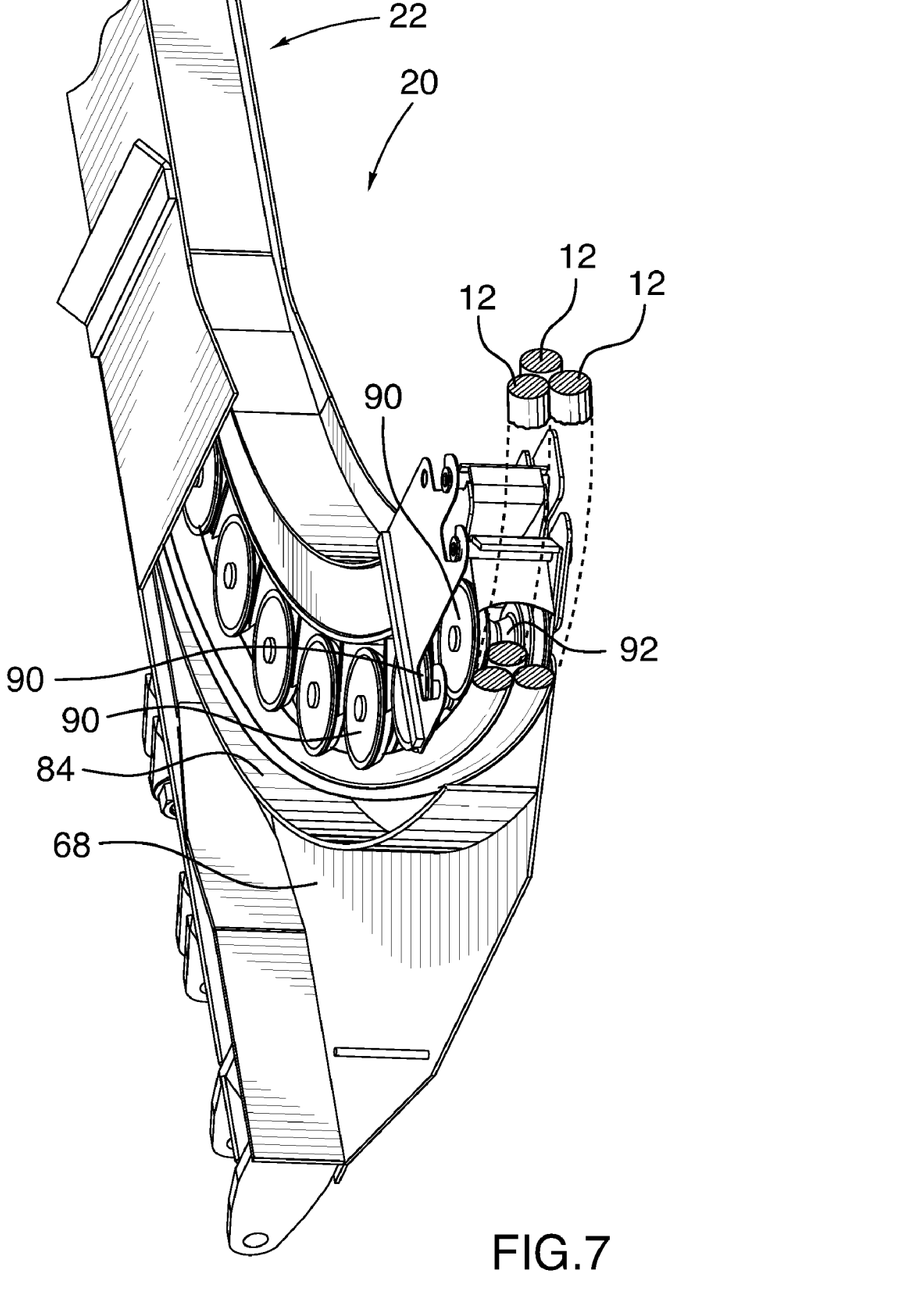
FIG. 7 is a cutaway perspective view of selected components from the portion of the system shown in FIG. 4.

A plurality of rollers 90 are positioned in the conduit feed passage 84 to facilitate transport of the conduits 12 through the conduit feed passage 84. For the specific embodiment shown in the figures to be laying three phase electrical conduits 12, the rollers 90 may be provided with a peripheral profile, shown at 92 (FIG. 7), that is configured to hold the conduits 12 in a triangular arrangement.

The conduit feed passage inlet 86 is positioned to receive the conduits 12 from the conduit reels 26. The conduit feed system 22 may further include a conduit guide 94 (FIG. 5) provided above the conduit feed passage inlet 86 to guide the conduits 12 from the conduit reels 26 over the vehicle cab, shown at 96 (FIG. 1), and downwardly into the conduit feed passage inlet 86.

Figure 9:
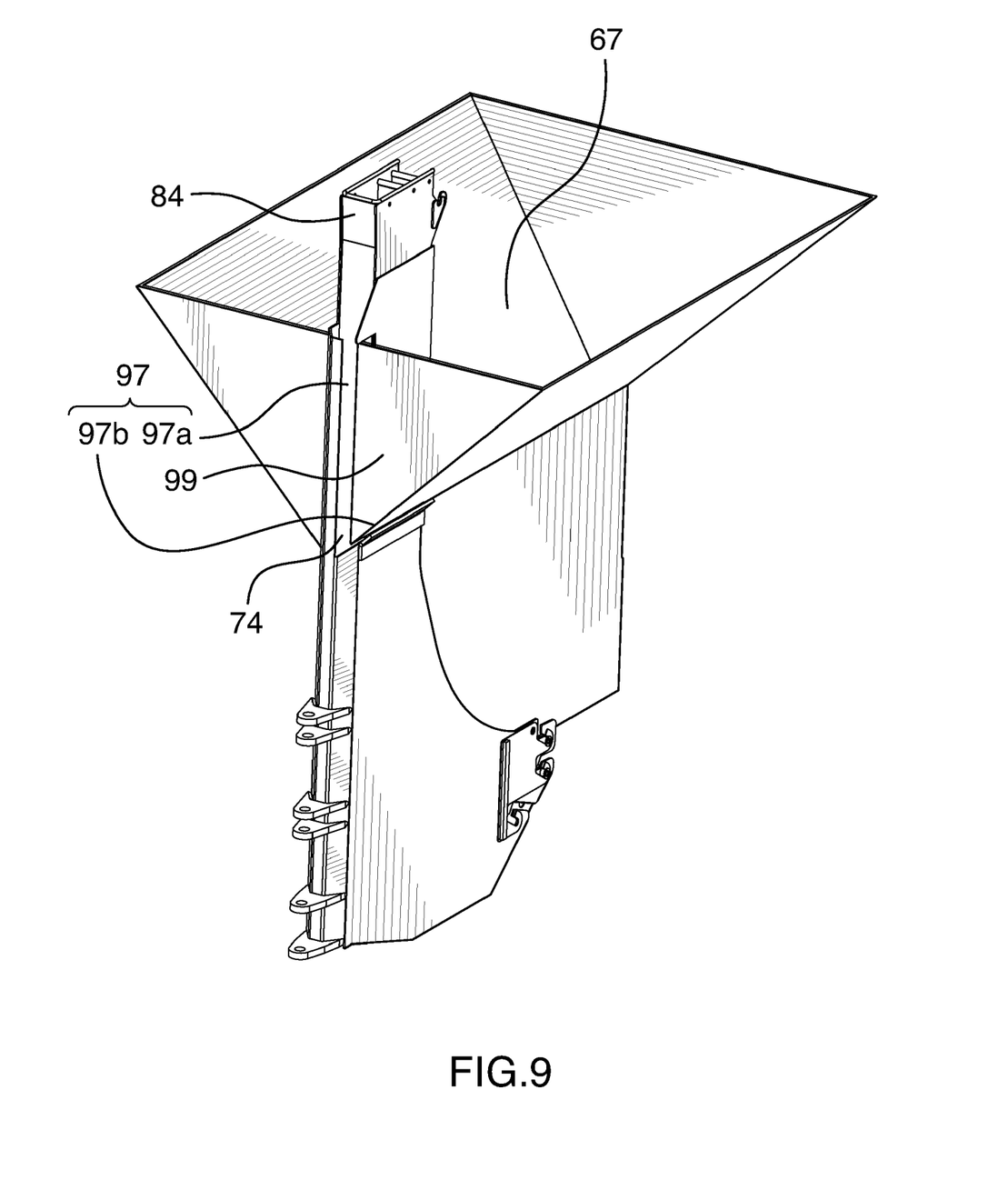
FIG. 9 is a perspective end view of the portion of the system shown in FIG. 4.

The first base material passage 68 may extend generally downwards (not necessarily strictly vertically downwards) from the first hopper outlet 74 to the first base material passage outlet 78. An air passage 97 may be provided in the wall 99 of the base material hopper 67 in the vicinity of the first hopper outlet 74. The air passage 97 inhibits bridging of the base material 14 as it passes through the first hopper outlet 74. The air passage 97 may be configured in any suitable way. In the embodiment shown in FIG. 9, the air passage 97 is configured as a vertical slit 978a that extends above and below the first hopper outlet 74 in combination with a horizontal passage 978b along a cross-sectional edge of the first hopper outlet 74.

Figure 8:
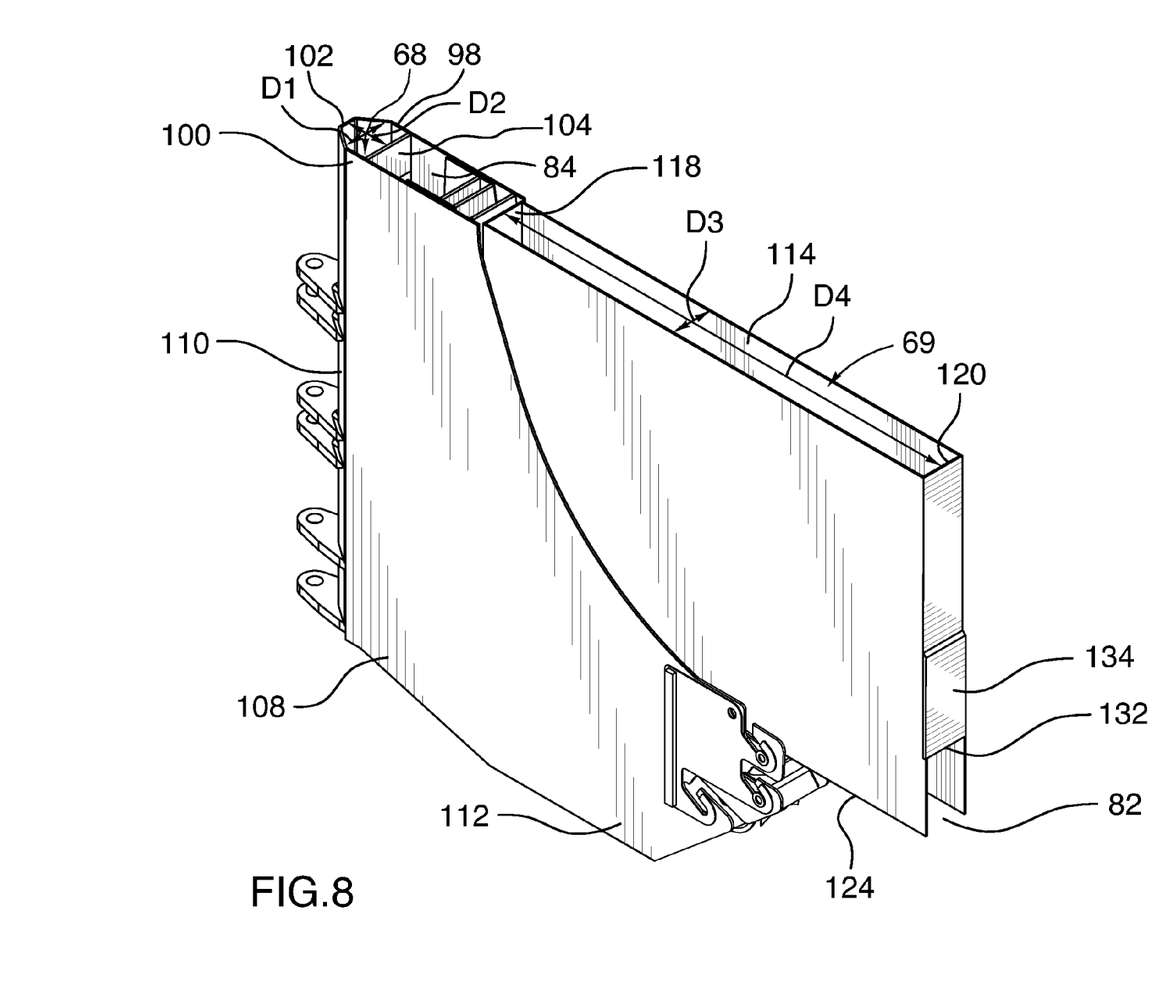
FIG. 8 is a sectional perspective view along section line 8-8 shown in FIG. 4.

Referring to FIG. 8, the first base material passage 68 may be generally rectangular in cross-section, and may be defined by a first side wall 98, a second side wall 100, a front wall 102 and a rear wall 104. The spacing between the first and second side walls 98 and 100 is shown at D1 and may be defined as the spacing of the first base material passage 68 in a lateral direction, i.e. a direction that is perpendicular to the direction of travel of the base material handling system 20. The spacing D1 increases progressively in a downward direction. Additionally, the spacing D1 between the first and second side walls 98 and 100 may increase progressively in the rearward direction. The spacing between the front and rear walls 102 and 104 is shown at D2 and may be defined as the spacing of the first base material passage in a longitudinal direction, i.e. a direction that is parallel to the direction of travel of the base material handling system 20. The spacing D2 may increase in the downward direction. By configuring the first base material passage 68 such that the spacing D1 increases in the downward and rearward directions and such that the spacing D2 increases in the downward direction, the first base material passage 68 is configured to inhibit bridging of the base material 14 therein. The rates of increase of the spacings D1 and D2 may be selected based on the particular properties of the base material 14. For some base materials, for example, such as certain types of sand, the spacing D1 may increase from about 5 inches at the top of the first base material passage 68, shown at 106 (FIG. 4), which is also the first hopper outlet 74, to about 5¼ inches at the bottom of the first base material passage 68, shown at 108, which is at the first base material passage outlet 78. Additionally, the spacing D1 (FIG. 8) may increase from about 5 inches at the front of the first base material passage 68, shown at 110, to about 5¼ inches at the rear of the first base material passage 68, which is shown at 112.

To achieve satisfactory flow of base material 14 in the first base material passage 68 it is particularly preferable for the first base material passage 68 to be provided with all three of the aforementioned features, namely that the spacing D1 increases in the downward direction; that the spacing D1 increases in the rearward direction; and that the spacing D2 increases in the downward direction. It is, however, alternatively possible that satisfactory flow of base material 14 can be achieved with only one or two of the aforementioned features being provided.

It will be noted that increasing one of the aforementioned spacings D1 and D2 as noted above does not necessarily mean that the cross-sectional area of the first base material passage 68 increases in the downward direction. It will also be noted that the first base material passage 68 need not be generally rectangular and may instead have any other suitable cross-sectional shape for transporting base material 14. For example, the first base material passage 68 may have one or more chamfered corners (as shown in FIG. 6). As another example, the first base material passage 68 may have a generally rounded cross-sectional shape, such as a circular cross-sectional shape, an elliptical cross-sectional shape, or an oval cross-sectional shape or an irregular cross-sectional shape. It is further possible for the first base material passage 68 to have a cross-sectional shape that changes along the length of the passage 68.

Without specific reference to any spacings (eg. D1 or D2), it is possible to achieve satisfactory flow of base material 14 by configuring the first base material passage 68 to have a cross-sectional area that increases progressively in a downward direction (see FIG. 4).

The second base material passage 69 may be similar to the first base material passage 68. For example, referring to FIG. 4, the second base material passage 69 may extend generally downwards (not necessarily strictly vertically downwards) from the second hopper outlet 80 to the second base material passage outlet 82. Referring to FIG. 8, the second base material passage 69 may be defined by a first side wall 114, a second side wall 116, with a lateral spacing D3 therebetween, and a front wall 118 and a rear wall 120, with a longitudinal spacing D4 therebetween. The second base material passage 69 may be configured such that the spacings D3 and D4 increase progressively in a downward direction from the top of the second base material passage 69, shown at 122 (FIG. 4), to the bottom of the second base material passage 69, shown at 124, and additionally such that the spacing D3 increases progressively in a rearward direction from the front of the second base material passage 69, shown at 126, to the rear of the second base material passage 69, shown at 128. By configuring the second base material passage 69 such that the spacing D3 (FIG. 6) increases in the downward and rearward directions and such that the spacing D4 increases in the downward direction, the second base material passage 69 is configured to inhibit bridging of the base material 14 therein. As with the spacings D1 and D2, the rates of increase of the spacings D3 and D4 may be selected based on the particular properties of the base material 14. Also as with the spacings D1 and D2, it is possible that satisfactory flow of base material 14 can be achieved by providing one or two of the three aforementioned features, though it is particularly preferable for the second base material passage 69 to be provided with all three of the aforementioned features.

It will be noted that increasing one of the aforementioned spacings D3 and D4 in the downward direction does not necessarily mean that the cross-sectional area of the second base material passage 69 increases in the downward direction. It will also be noted that decreasing one of the aforementioned spacings D3 or D4 does not imply that the overall cross-sectional area of the second base material passage 69 is decreasing. In particular, it can be observed in FIG. 4 that along a lower portion of the second base material passage 69, the longitudinal spacing D4 decreases, while the lateral spacing D3 increases. The cross-sectional area of the second base material passage 69 may or may not increase in this region, depending on specific values for the spacings D3 and D4.

It will further be noted that, for the second base material passage 69, the spacing D3 (i.e. the lateral spacing) is smaller than the spacing D4 (the longitudinal spacing). By increasing the smaller spacing (in this particular case, the lateral spacing), satisfactory flow of base material 14 may be achieved even when the other spacing (in this case the longitudinal spacing) decreases along a portion of the length of the passage 69.

As noted for the first base material passage 68, the second base material passage 69 need not have a generally rectangular cross-section and may instead have any suitable cross-sectional shape for transporting base material. It is further possible for the second base material passage 69 to have a cross-sectional shape that changes along the length of the passage 69.

Without specific reference to any spacings (eg. D3 or D4), it is possible to achieve satisfactory flow of base material 14 by configuring the second base material passage 69 to have a cross-sectional area that increases progressively in a downward direction.

It will be noted that the vibration that occurs during use of the trench former 18 (FIG. 1) may pass into the base material 14 that is held in the base material hopper 67 and in the first and second base material passages 68 and 69 (FIG. 4). With certain types of base material 14, the induced vibration may urge the base material 14 to pack, which would encourage bridging. Because of the induced vibration, it is particularly advantageous to increase the cross-sectional areas of the first and second base material passages 68 and 69 in the downward direction and/or to increase the spacings D1 and/or D2 and D3 and/or D4 in the downward direction as described above.

As the vehicle 24 moves forward, base material 14 is discharged from the first base material passage 68 onto the floor of the trench 11. The thickness of the layer of base material 14 that is discharged from the first base material passage 68 is determined by the height of the bottom edge, shown at 130, of the rear wall 104. The conduits 12 are laid on top of the layer of base material 14 discharged from the first base material passage 68. Base material 14 is discharged from the second base material passage 69 on top of and around the conduits 12, preferably such that the base material 14 surrounds the conduits 12 in the trench 11. The thickness of the layer of base material 14 that is discharged from the second base material passage outlet 82 is controlled by the height of the bottom edge, shown at 132, of an outlet panel 134 that makes up a bottom portion of the rear wall 128 of the second base material passage 69. The outlet panel 134 may be vertically movable so that the height of the bottom edge 132 can be selected, so that the thickness of the layer of base material 14 discharged from the second base material passage 69 may be selected.

To assist in protecting the conduits 12 from inadvertent damage from work being carried out by workers afterwards, a cover layer 136 may be provided from a cover layer reel (not shown) and may be fed through a cover layer passage 138 and discharged on top of the conduits 12. The cover layer passage 138 may extend adjacent the conduit feed passage 84. The cover layer 136 may be made from a relatively tough material that is resistant to puncture from construction equipment such as the bucket from a backhoe loader. Thus, in the event that a worker inadvertently encounters the cover layer 136 later on while digging, the cover layer 136 will resist puncture and will thus provide some protection to the conduits 12 lying underneath, inhibiting damage to them from the worker's construction equipment.

Additionally, or alternatively, the system 10 may further include a marker tape reel support 140 that holds a reel 141 of marker tape 142 and a marker tape passage 144 that carries the marker tape 142 to a marker tape passage outlet 146. The marker tape passage 144 may be connected to the outlet panel 134 so that the marker tape passage outlet 146 is always a selected distance above the bottom edge 132 of the outlet panel 134. In this way, the marker tape 146 is always laid down in a consistent manner on top of the base material 14 that is discharged from the second base material passage 69. As an alternative however, it is possible for the marker tape passage 144 to be connected to a non-moving member, such as a non-moving portion of the rear wall 128. It will be understood that in such an alternative embodiment, the distance between the marker tape passage outlet 146 and the top of the base material 14 would vary depending on the particular position of the outlet panel 134.

It is conceivable that a customer may wish to use an existing vehicle 24 and conduit reel support 16 (if one is required for the particular application) instead of purchasing those components as part of the system 10. Accordingly, it is possible that a supplier may supply an assembly that is made up of only the trench former 18, the base material handling system 20 and the conduit feed system 22 instead of supplying the entire system 10.

While the above description constitutes a plurality of embodiments of the present invention, it will be appreciated that the present invention is susceptible to further modification and change without departing from the fair meaning of the accompanying claims.

The invention claimed is:

1. An assembly for laying conduit, comprising:
a trench former configured for forming a trench;
a conduit feed system including a conduit feed passage having a conduit feed passage inlet for receiving at least one conduit and a conduit feed passage outlet positioned to deposit the at least one conduit in the trench; and
a base material handling system including a base material hopper and at least one base material passage, wherein the at least one base material passage is positioned to receive base material from the base material hopper and to discharge base material in the trench around the at least one conduit and wherein the at least one base material passage includes a first base material passage having a first base material passage outlet and a second base material passage having a second base material passage outlet, wherein the first base material passage outlet is positioned to discharge base material into the trench, wherein the conduit feed passage outlet is positioned to deposit the at least one conduit onto base material discharged from the first base material passage outlet, and wherein the second base material passage outlet is positioned to discharge base material onto the at least one conduit deposited from the conduit feed passage outlet.

2. The assembly according to claim 1, wherein the at least one conduit is three electrical conduits.

3. The assembly according to claim 2, wherein the conduit feed passage includes at least one roller, wherein the at least one roller has a peripheral profile that is configured to hold the three electrical conduits in a triangular arrangement.

4. The assembly according to claim 1, wherein each base material passage is defined by a first side wall, a second side wall, a front wall and a rear wall, and wherein the first and second side walls are spaced apart by a first spacing and wherein the front and rear walls are spaced apart by a second spacing, wherein at least one of the first and second spacings increases progressively in a downward direction to inhibit bridging of base material in the at least one base material passage.

5. The assembly according to claim 4, wherein the first spacing increases in a rearward direction to inhibit bridging of base material in the at least one base material passage.

6. The assembly according to claim 4, wherein one of the first and second spacings is a relatively larger spacing and the other of the first and second spacings is a relatively smaller spacing, and wherein the relatively smaller spacing increases progressively in a downward direction.

7. The assembly according to claim 1, wherein each base material passage is defined by a first side wall, a second side wall, a front wall and a rear wall, and wherein the first and second side walls are spaced apart by a first spacing that increases in a downward direction and in a rearward direction and wherein the front and rear walls are spaced apart by a second spacing that increases in a downward direction, to inhibit bridging of base material therein.

8. The assembly according to claim 1, wherein each base material passage has a cross-sectional area that increases in a downward direction to inhibit bridging of base material therein.

9. The assembly according to claim 1, wherein at least one base material passage outlet has an upper edge that is defined by an outlet panel, wherein the outlet panel is movable to control the height of the upper edge of the base material passage outlet, thereby controlling the height of base material released from the base material passage outlet.

10. The assembly according to claim 9, further comprising a marker tape passage having a marker tape passage outlet, wherein the marker tape passage is configured to carry a marker tape and deposit the marker tape from the marker tape passage outlet in the trench above the at least one conduit deposited from the conduit feed passage, wherein the marker tape passage is movable with the outlet panel.

11. The assembly according to claim 1, wherein the trench former comprises a plow having a front face that is generally flat in a lateral direction.

12. The assembly according to claim 1, wherein the trench former has a rear and wherein the base material handling system is pivotally connected about a vertical axis to the rear of the trench former.

13. A conduit laying system, comprising:
a vehicle;
a trench former connected to the vehicle and configured for forming a trench;
a conduit feed passage having a conduit feed passage inlet for receiving at least one conduit and a conduit feed passage outlet positioned to deposit the at least one conduit in the trench;
a base material hopper configured to hold a base material; and
at least one base material passage, wherein the at least one base material passage is positioned to receive base material from the base material hopper and to discharge base material in the trench around the at least one conduit and wherein the at least one base material passage includes a first base material passage having a first base material passage outlet and a second base material passage having a second base material passage outlet, wherein the first base material passage outlet is positioned to discharge base material into the trench, wherein the conduit feed passage outlet is positioned to deposit the at least one conduit onto base material discharged from the first base material passage outlet, and wherein the second base material passage outlet is positioned to discharge base material onto the at least one conduit deposited from the conduit feed passage outlet.

14. The conduit laying system according to claim 13, wherein each base material passage is defined by a first side wall, a second side wall, a front wall and a rear wall, and wherein the first and second side walls are spaced apart by a first spacing and wherein the front and rear walls are spaced apart by a second spacing, and wherein at least one of the first and second spacings increases progressively in a downward direction to inhibit bridging of base material in the at least one base material passage.

15. The conduit laying system according to claim 14, wherein the first spacing increases in a rearward direction to inhibit bridging of base material in the at least one base material passage.

16. The conduit laying system according to claim 14, wherein one of the first and second spacings is a relatively larger spacing and the other of the first and second spacings is a relatively smaller spacing, and wherein the relatively smaller spacing increases progressively in a downward direction.

17. The conduit laying system according to claim 13, wherein each base material passage is defined by a first side wall, a second side wall, a front wall and a rear wall, and wherein the first and second side walls are spaced apart by a first spacing that increases in a downward direction and in a rearward direction and wherein the front and rear walls are spaced apart by a second spacing that increases in a downward direction, to inhibit bridging of base material therein.

18. The conduit laying system according to claim 13, wherein each base material passage has a cross-sectional area that increases in a downward direction to inhibit bridging of base material therein.

19. The conduit laying system according to claim 13, wherein the vehicle has a front and a rear and wherein the trench former is pivotally connected to the rear of the vehicle.

20. The conduit laying system according to claim 19, further comprising a connecting arm having a first end that is pivotally connected to the rear of the vehicle and a second end that is pivotally connected to the trench former.

21. The conduit laying system according to claim 19, wherein the trench former has a rear and wherein the base material hopper is pivotally connected about a vertical axis to the rear of the trench former.

22. The conduit laying system according to claim 13, wherein the trench former, the base material hopper, the at least one base material passage and the conduit feed passage are height adjustable relative to the vehicle.

23. The conduit laying system according to claim 13, wherein the trench former is pivotally connected to the vehicle, and wherein the conduit laying system further comprises an angle holding system for holding the trench former at a selected angle in a horizontal plane, relative to the vehicle.

24. The conduit laying system according to claim 13, further comprising a conduit reel support connected to the vehicle and configured for supporting at least one conduit reel.

25. A conduit laying system, comprising
a trench former configured for forming a trench, wherein the trench former includes a vibration mechanism;
a conduit feed passage having a conduit feed passage inlet for receiving at least one conduit and a conduit feed passage outlet positioned to deposit the at least one conduit in the trench; and
a base material handling system including a base material hopper and at least one base material passage, wherein the at least one base material passage is positioned to receive base material from the base material hopper and to discharge base material in the trench around the at least one conduit, wherein the at least one base material passage has a cross-sectional area that increases in a downward direction to inhibit bridging of base material therein and wherein the at least one base material passage includes a first base material passage having a first base material passage outlet and a second base material passage having a second base material passage outlet, wherein the first base material passage outlet is positioned to discharge base material into the trench, wherein the conduit feed passage outlet is positioned to deposit the at least one conduit onto base material discharged from the first base material passage outlet, and wherein the second base material passage outlet is positioned to discharge base material onto the at least one conduit deposited from the conduit feed passage outlet.

* * * * *